(12) United States Patent
Kinsbergen et al.

(10) Patent No.: US 10,484,448 B2
(45) Date of Patent: Nov. 19, 2019

(54) METHOD TO HANDLE PROBLEMATIC PATTERNS IN A LOW LATENCY MULTIMEDIA STREAMING ENVIRONMENT

(71) Applicant: JACOTI BVBA, Wevelgem (BE)

(72) Inventors: Jacques Kinsbergen, Antwerp (BE); Nun Mendez, Tenerife (ES); Nicolas Wack, Barcelona (ES)

(73) Assignee: JACOTI BVBA, Wevelgem (BE)

( * ) Notice: Subject to any disclaimer, the term of this patent is extended or adjusted under 35 U.S.C. 154(b) by 262 days.

(21) Appl. No.: 15/515,797

(22) PCT Filed: Oct. 1, 2015

(86) PCT No.: PCT/EP2015/072708
§ 371 (c)(1),
(2) Date: Mar. 30, 2017

(87) PCT Pub. No.: WO2016/050916
PCT Pub. Date: Apr. 7, 2016

(65) Prior Publication Data
US 2017/0318071 A1 Nov. 2, 2017

Related U.S. Application Data

(60) Provisional application No. 62/058,769, filed on Oct. 2, 2014.

(51) Int. Cl.
*H04L 29/06* (2006.01)
*H04L 1/18* (2006.01)
*H04L 12/863* (2013.01)

(52) U.S. Cl.
CPC ............ *H04L 65/80* (2013.01); *H04L 1/1835* (2013.01); *H04L 47/6295* (2013.01);
(Continued)

(58) Field of Classification Search
None
See application file for complete search history.

(56) References Cited

U.S. PATENT DOCUMENTS 5,265,217 A * 11/1993 Koukoutsis ........ H03H 17/0288
704/200
6,862,298 B1    3/2005 Smith et al.
(Continued)

OTHER PUBLICATIONS

Ianniello. "Time Delay Estimation Via Cross-Correlation in the Presence of Large Estimation Errors," IEEE Transactions on Acoustics, Speech, and Signal Processing, Dec. 1982 (Year: 1982).*
(Continued)

*Primary Examiner* — Scott B Christensen
(74) *Attorney, Agent, or Firm* — Workman Nydegger

(57) ABSTRACT

A method for buffer load management in a communication device includes storing in a first buffer of the communication device, multimedia data comprised in data packets, determining an indication of the input rate at that first buffer and adding the indication to a second buffer containing information on the input rate over time, performing an autocorrelation on a signal comprising said information on the input rate over time, finding peaks in the autocorrelation and identifying a peak in a period to perform for the peak, a crosscorrelation of the signal comprising the information on the input rate over time with a periodic signal with given phase, selecting a part of the information on the input rate stored in the second buffer, using a reference signal, determining a target latency for the first buffer, and applying the target latency to the first buffer.

12 Claims, 2 Drawing Sheets

(52) U.S. Cl.
CPC .......... *H04L 65/403* (2013.01); *H04L 65/601* (2013.01); *H04L 65/604* (2013.01)

(56) References Cited

U.S. PATENT DOCUMENTS

| | | | |
|---|---|---|---|
| 8,548,041 B2* | 10/2013 | Fu | H04N 19/147 375/240.02 |
| 2005/0232309 A1* | 10/2005 | Kavaler | H04L 29/06027 370/519 |
| 2006/0045139 A1 | 3/2006 | Black et al. | |
| 2007/0177699 A1* | 8/2007 | Fite | H04B 1/7075 375/355 |
| 2007/0220184 A1 | 9/2007 | Tierno | |

OTHER PUBLICATIONS

Esquef et al., "Interpolation of Long Gaps in Audio Signals Using the Warped Burg's Method," Proceedings of the 6th Int. Conference on Digital Audio Effects (DAFx-03), London, UK, Sep. 8-11, 2003, pp. 1-6, URL: http://lib.tkk.fi/Diss/2004/isbn9512269503/article3.pdf.
Hila et al., "Efficient Structures for Time Delay Estimation in Time-Varying Environments," IEEE Asia Pacific Conference on Circuits and Systems, Nov. 30, 2008, pp. 1426-1429.
International Search Report for corresponding International PCT Application No. PCT/EP2015/072708, dated Dec. 16, 2015.

* cited by examiner

METHOD TO HANDLE PROBLEMATIC PATTERNS IN A LOW LATENCY MULTIMEDIA STREAMING ENVIRONMENT

FIELD OF THE INVENTION

The present invention is generally related to the field of devices capable of data communication. More in particular, it relates to the field of solutions for dealing with events in low latency transport links.

BACKGROUND OF THE INVENTION

It is well known that large rooms are a challenging environment for acoustic communication. For example, in a typical classroom the distance between the teacher and the students is considerably larger than the typical distance of about 1 to 1.5 meter during a normal one-to-one communication. Therefore, the voice of the teacher is relatively weak at the position of the student. External noise sources as well as the voices or other sounds coming from fellow students add to the acoustics, resulting in a low or even negative signal-to-noise ratio. In addition, the walls of the room add acoustic reverberation to the voice of the teacher, which further reduces its intelligibility.

While the above problems are especially severe for hearing impaired students in a classroom, they are also present outside the classroom, e.g. during a business meeting in a large room, in a room with poor room acoustics or simply because some meeting participants talk or make sounds during a presentation.

In the prior art solutions are known implemented based on radio transmission of the teacher's voice to the hearing aids of the student. This system is referred to as an 'FM system'. FIG. 1 provides an illustration. By means of FM wireless transmission, audio data is transferred to a receiver, which then plays the signal to a headphone or hearing aid.

In recent years FM systems have been improved by the implementation of signal-to-noise ratio estimation in separate frequency regions at the teacher position and transmitting this information to the FM receiver in order to improve speech intelligibility by adding gain to the voice of the teacher in frequency regions with more noise energy.

An important limitation of FM systems is that they don't allow changing the signal latency. This is especially critical in applications where latency needs to be increased to be synchronous with, for example, a video stream. Another important limitation is that FM systems are analog, offering no way at the end point to perform signal error correction, and that they are susceptible to interference. Those systems are also unidirectional, making it impossible to transmit back audio from the receiver using the same frequency band.

An important challenge in any digital audio solution is to keep the latency introduced by the digital signal processing as low as possible. The latency of a system is defined as the time difference between the time at which some data is received in the system and the time at which the same data is outputted. The challenge imposed by WiFi technology when it comes to low latency audio, is well known. To the best of our knowledge, no audio-over-network solution available on the market offers an audio latency over WiFi of less than 100 ms. Impairments like jitter, radio mode change or other are very detrimental when it comes to a low latency stream of data.

The main solution to deal with those impairments involves buffering large enough amounts of data before playing the stream out. In this way, the system can withhold periods of time where no data is arriving into the system by playing the data that has been already buffered. One specific issue of low latency systems is the inability to react upon impairments in an efficient way, due to the little amount of data that is buffered (because buffering directly translates into added latency). In that sense, low latency streaming systems adopt an 'optimistic' approach, where as little as possible data is buffered to compensate for short time impairments (like jitter). This makes those systems especially vulnerable to impairments that can happen over larger periods of time. Examples of such impairments that "sometimes" happen are radio mode changes or other applications running over the same transport link, occupying all the bandwidth from time to time. Therefore, these low latency streaming systems rely much more on audio inferring/repairing mechanisms due to the higher probability of them running out of data to play out. VoIP solutions can be applied over WiFi to obtain a system capable of streaming real time audio over a local area network. Such systems, however, are generally designed to communicate audio over the Internet and have little restrictions on latency requirements, as they normally interconnect people that do not have direct visual contact because they communicate over larger distance and are not in the same room. Because of the large latency, these systems are not generally suitable for use to transmit audio on a latency-constrained environment such as for communication in the same room.

Similar observations can be made with respect to video data. The importance of low latency can be illustrated for the case of a deaf person who wants to follow a conference at which he is physically present and where an additional video stream is broadcasted to an assistive device (like a smartphone, smartglasses, etc.). The same latency constrained environment occurs in a concert, where the audience receives the audio signal directly from the public address system, but multiple video streams are available for those who want to see on their personal communication devices details of the concert they don't want to miss (for example, a video stream exclusively showing the guitar player or a video stream that shows only the singer). Obviously it is important in these cases to keep the latency of the video signals under control, preferably as low as possible.

It is increasingly important that such solutions can be run on personal multipurpose devices (such as smartphones or tablets). Those devices are becoming a central point of communication for the users and they serve as a platform for the development of various extra functionalities, just by running software solutions on said devices. The same applies for wireless communication platforms. The importance of running solutions on widespread transport links (such as WiFi 802.11X) is growing, not just from a cost point of view, but also from a convenience point of view. Those devices are also easily serviceable, even from remote locations.

It is important to note that in those devices solutions exist that fulfil the above requirements, but no solution running on those commodity platforms meets the needs of the described latency-constrained environment. In those environments the dynamic adaptation of the system to the performance available at any particular time suddenly becomes one of the most critical factors to take into account.

Hence, there is a need for a solution to deal with latency constrained environments on personal multipurpose devices.

SUMMARY OF THE INVENTION

It is an object of embodiments of the present invention to provide for a method for managing the buffer load and avoid periodic disturbances on a communication device.

The above objective is accomplished by the solution according to the present invention.

In a first aspect the invention relates to a method for buffer load management in a communication device. The method comprises:

storing in a first buffer of said communication device, multimedia data comprised in data packets, determining an indication of the input rate at that first buffer and adding said indication to a second buffer containing information on the input rate over time, performing an autocorrelation on a signal comprising said information on the input rate over time, finding peaks in the autocorrelation and identifying for at least one peak in a set of found peaks a period, performing, for said at least one peak, a crosscorrelation of the signal comprising the information on the input rate with a periodic signal with given phase having the identified period as predominant period and determining a phase offset with respect to the periodic signal, selecting one or more parts of the information on the input rate stored in the second buffer, using a reference signal being periodic with the identified period as predominant period and having the phase offset as determined in the previous step, determining a target latency for the first buffer by analysing the selected parts, applying the target latency to the first buffer by modifying the output rate and/or the input rate of the first buffer.

The proposed solution indeed allows for detecting and accounting for periodic disturbances by determining a target latency. This target latency is derived from an analysis of information on the input rate over time. From this information first a period is derived and next a phase offset, so that parts of the stored signal containing info on the input rate with that pattern can be selected. From those parts a target latency is then determined, which is subsequently applied to the first buffer.

In a preferred embodiment the method further comprises a step of decimating the signal comprising said information on the input rate over time. In this way the computational complexity is further reduced.

In one embodiment the size of the second buffer corresponds to a time interval of at least 10 seconds.

Advantageously the second buffer is implemented as a ring buffer.

The indication of the input rate is preferably the fill percentage of the first buffer, along with a known output rate. An alternative may be the timestamps of each data packet arrival or the amount of milliseconds held in the first buffer.

In one embodiment the step of selecting one or more parts is performed using a logical function.

Advantageously, the selected one or more parts are stored in a third buffer.

In a preferred embodiment the method comprises sending a message to a transmitter transmitting said multimedia data, said message relating to an adjustment of the input rate.

Advantageously a new target latency is calculated when the information on the input rate over time is updated.

In one embodiment a temporal filtering is performed on the target latency.

In one aspect the invention relates to a program, executable on a programmable device containing instructions, which, when executed, perform the method as previously described.

In another aspect the invention relates to a communication device comprising an input and an output for receiving and outputting multimedia data comprised in data packets, a first buffer for storing the received multimedia data, a second buffer for storing information on the input rate of the first buffer over time, control means for controlling the output rate of the first buffer, processing means arranged for determining an indication of the input rate at the first buffer and adding said indication to the second buffer, for performing an autocorrelation on a signal comprising said information on the input rate over time, for finding peaks in the autocorrelation and identifying for at least one peak in a set of found peaks a period, for performing, for said at least one peak, a crosscorrelation of the signal comprising the information on the input rate over time with a periodic signal with given phase having said identified period as predominant period and determining a phase offset with respect to the periodic signal, for selecting one or more parts of the information on the input rate stored in the second buffer, using a reference signal being periodic with the identified period as predominant period and having the determined phase offset, and for determining and applying a target latency for the first buffer by analysing the selected parts.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
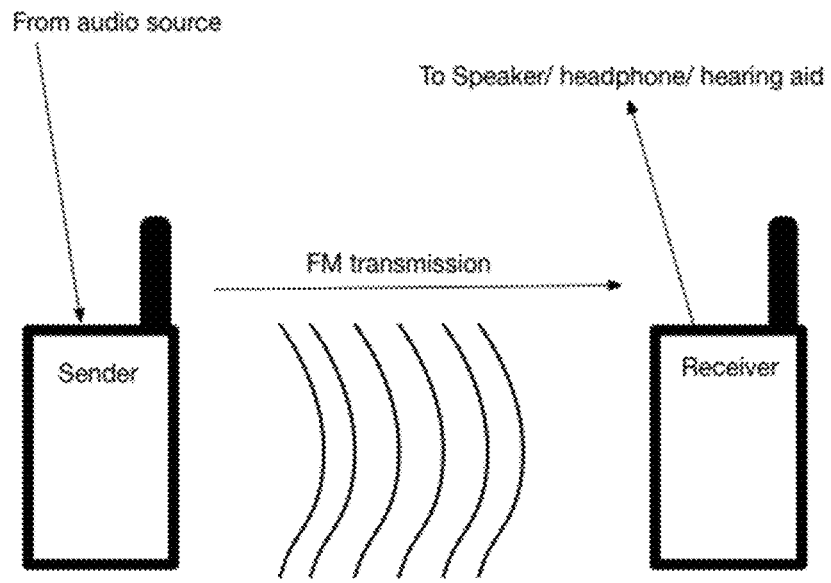
FIG. 1 illustrates a standard FM assistive listening device as known in the art.
Figure 2:
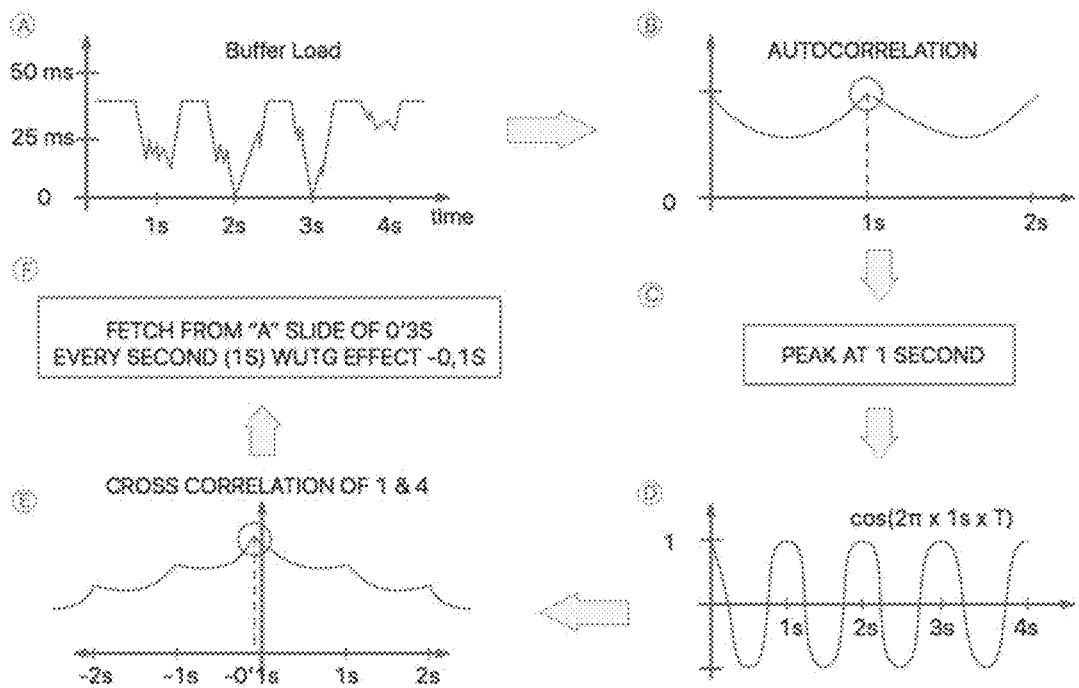
FIG. 2 illustrates a scheme of an embodiment of the method presented in the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates to a method for selectively identifying and analysing data containing information related to a periodic event in a given signal obtained from incoming data on the receiver of a device capable of multimedia communication. The proposed algorithm identifies problematic patterns that can occur over long periods of time (e.g., 10 seconds or more) and analyses those parts of the data set where the problems have occurred. Statistical analysis is performed on that data subset to output an indication of the amount of data to be buffered (in other words, a latency to be introduced) so that protection against future occurrence of such events is guaranteed, thus improving the overall quality of the stream. This approach has the particular advantage that it does not impose a penalty on the overall latency of the device, unless a certain quality factor needs to be guaranteed. Said quality factor can be given, for example, by a user preference or by a hard-coded policy on the device.

Conceptually, the algorithm exploits a data set of measurements indicative of the input rate of the transport link receiving the signal (e.g., the evolution of the buffer fill percentage over a certain period of time). This measurement data is analysed to find patterns that cause problems on the stream. Those patterns are identified as slices of data in said set of measurement data and analysed to estimate a latency value to add, if necessary, in order to avoid future problems due to this pattern.

In one embodiment the method according to the invention is executed as follows, whereby information about the output rate of the communication device is assumed to be known and controllable:

the load state of a jitter buffer containing multimedia data to be outputted is periodically sampled at a sample rate SR. The samples are added to a ring buffer R1 of duration T comprising data indicative of the input rate over time, i.e. over the last T seconds. The resulting sampled signal effectively contains the variations in the jitter buffer load state.

Optionally this signal is decimated (i.e. downsampled) by a factor DF. This reduces the amount of information to analyse, thus the computational cost, while enough characteristics of the evolution are maintained to identify potential troubling parts. The decimated signal is stored into a ring buffer R2 of duration T.

Next an autocorrelation analysis is run over the sampled signal (or, if available, the decimated sampled signal). This yields a representation of the patterns present in the auto-correlated signal as peaks in the Y axis and on the X axis the lags, which can trivially be converted to a period by taking into account the sample rate SR.

On the autocorrelation signal peak detection is performed to identify potential patterns on the signal that might cause problems on the stream. Peak detection algorithms are commonly available in the art. Typically, for a periodic disturbance, an autocorrelation analysis represents the disturbance as a set of peaks, each peak being a multiple of a main period.

For at least one peak, preferably all occurring peaks, found the following steps are carried out:

a) the period T of an event giving rise to the peaks, is identified (X value×DF/SR)

b) a cross correlation is computed of a cosine signal with period T and a given phase, e.g. zero phase, with the data set stored in buffer R2. Instead of a cosine signal any suitable periodic function with period T can be applied. A periodic function with period T should be construed as a function wherein T is the predominant period (i.e. also other, less prominent periodic patterns can be present).

c) Peak detection is performed on the resulting cross correlation signal to find out the phase offset P of the troubling parts with respect to the phase of the periodic function. This phase offset is determined by the X value of the detected peak by using the same calculation (X value× DF/SR).

d) By means of a logical function, chunks of data in buffer R1 are selected in the following way. Taking into account the X values of the maximum of a cosine function of period T and the phase offset, windows of a given size W are created centred in said maximum using the period T and the calculated phase offset. From R1 those data is selected that overlaps with such windows. This subset of data selected from R1 is stored in an analysis buffer B.

e) The data in buffer B is analysed statistically and an indication of a target amount of data to be buffered is outputted, based on a statistical computation, such as requiring 99th percentile of the data to be estimated to be delivered. As another example, this computation also can simply count the longest streak of buffer underrun time and output an amount of data equivalent in time to that figure.

The present algorithm serves as a "long term statistical analysis" that is complementary to the analysis performed over short periods of time (usually less than a second).

Figure 3:
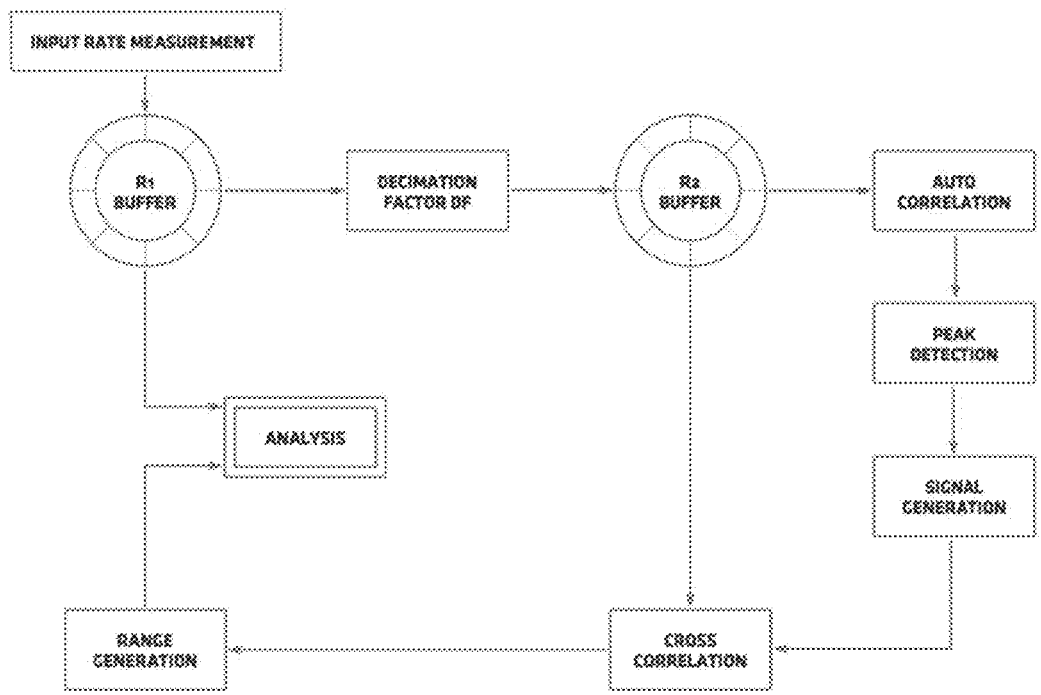
FIG. 3 illustrates an exemplary application of the algorithm of the invention.

By way of example, the data shown in FIG. 3 is considered. FIG. 3A depicts a buffer load history over a time interval of a number of seconds. As illustrated, there is some disturbance occurring every second on the network that makes the buffer run short of data periodically. This can, for example, be due to another application running in the same network which makes use of the bandwidth in short bursts every second. Ideally, this data should be analysed to be able to predict events that may happen in the future (such events are likely to happen around times 5 s, 6 s, and so on . . . ). In FIG. 3B an autocorrelation of the buffer data is performed, displaying a clear peak around is periodicity. A peak detection algorithm then detects this peak at 1 s (FIG. 3C). In order to go back to the buffer data and identify those events, the offset of the patterns in the buffer history timeline needs to be estimated. FIG. 3D shows a cosine signal built with the same detected period (1 second in this case). FIG. 3E shows the cross-correlation of this cosine signal and the buffer data. This cross-correlation is used to determine the phase offset between the data stored in the buffer and the periodic signal-applied in the cross-correlation calculation. In this example a clear peak is detected at (−0.1 s), which means the patterns are shifted over −0.1 s in the buffer timeline. With this information, one can selectively extract parts of data from the buffer timeline that correspond to events that occur every one second. In this case, it was chosen to extract windows of 0.3 s shifted in the buffer timeline by −0.1 s. As a result, the following ranges are extracted: (0.75, 1.05), (1.75, 2.05), (2.75, 3.05), (3.75, 4.05). This subset of data is then analysed to determine a minimum buffer load to avoid disturbances due to future occurrences of this event. In this case, it is enough to have around 40 ms of data saved.

In the example above, the input to the algorithm is the evolution of the amount of milliseconds held in the jitter buffer, which is a direct measure of the performance of the communication device. The input rate of the system can be determined by knowing the output rate of the device. The algorithm output is an indication of the target amount of data to be saved or, put in another way, a target latency to be applied to the communication device. The target latency is then applied to the jitter buffer by modifying its output rate and/or the input rate.

A communication device adapted to perform an algorithm according to an embodiment of the present invention is capable of performing the following tasks:
receiving data packets comprising the multimedia data,
storing said multimedia data in a first buffer,
controlling the output rate (and thus being aware of the actual value of the output rate) or the input rate or both,
deriving at least one characteristic indicative of the input rate,
determining a target latency for the multimedia data stored in that first buffer that is to be outputted, based on statistical information derived from the at least one characteristic indicative of the input rate and information on the output rate,
adjusting the latency introduced by the buffer so that it complies with the target latency, by modifying the rate at which said multimedia data is outputted or the rate at which said multimedia data is stored in the buffer, or a combination of both.

In one embodiment the device according to the invention has data communication capability and is arranged for receiving data packets and comprises
a first buffer for storing multimedia data comprised in said data packets,
means for deriving at least one indication of the input rate of said received data packets and for measuring a latency introduced by said buffer,
an output for outputting said multimedia data,
a second buffer for storing the at least one characteristic indicative of the input rate of said received data packets,
processing means arranged for performing autocorrelation on said second buffer, performing peak detection on that autocorrelation signal, generating a periodic signal, performing a cross correlation of that characteristic with the periodic signal to determine the phase offset and for selecting data subsets of said second buffer.

Information on the output rate of the device is available. The device comprises a control logic module adapted for determining a target latency for the multimedia data to be outputted from the buffer based on statistical information derived from the measured at least one indication of the input rate and the data in the second buffer. The control logic is adapted for modifying the rate at which the multimedia data is outputted or the rate at which the multimedia data is stored in the buffer in order to adjust the latency introduced by the buffer so that it complies with the target latency.

In a personal communication device the buffer size is large enough to hold amounts of data much larger than the average amount (e.g., buffer size is one second, but it is designed to hold an average of 20 ms of data). This particular design has the advantage of being very unlikely to overflow. A very common buffer design involves having a buffer size equal to double the average amount of data to be hold, which can result in large overflows of data (and thus loss) when large bursts arrive in the communication device. As an example, consider a video stream which is streamed over the Internet. The receiver implements a buffering mechanism to compensate for the jitter of the network comprising a buffer of two seconds, and holding an average value of 1 s. This can effectively compensate for jitter values around one second without having discontinuities in the stream. Then assume the receiver stops having Internet connection for five seconds. When the receiver recovers the connection, five seconds of video data are going to arrive to the system. The device then needs to discard three seconds of video data, because it only has room to store two seconds. In a buffer which is practically unbounded on the upper side (buffer much larger than average amounts to be held), the device is able to absorb the full five seconds of video and then play it at a faster rate, for example, until the average amount of data held in the buffer is back to the nominal value of 1 s.

In a communication device according to the invention a network disturbance has to occur multiple times in order to be detected as a pattern. Random disturbances always negatively affect the performance of the device. Due to the previously mentioned "optimistic" approach that low latency solutions take (by buffering as little as possible amount of data before playing it out), it is then of great importance to have in place a solution that is able to infer the streamed data whenever it runs out of it (buffer underrun). Mechanisms to infer data can be found in the literature. For example, in the audio environment, one can infer audio by using the Warped Burg's method as described, for example, in Esquef et al.,"Interpolation of Long Gaps in Audio Signals Using the Warped Burg's Method,"Proceedings of the 6th Int. Conference on Digital Audio Effects (DAFx-03). London, UK, Sep 08-11, 2003, pp. 1-6. However, such methods often introduce too much latency or have too much computational complexity. It is then necessary to have a computationally inexpensive device with as little added latency as possible.

In another embodiment the device is capable of informing a transmitter that it has certain capabilities and requirements. This allows the transmitter to optimize the stream it sends to the receiver. Said capabilities can include, but are not limited to, information on output rate, output bandwidth, total device latency, etc. On the other hand, the requirements can include, but are not limited to, maximum acceptable total latency, minimum and/or maximum temporal length of the data packets. This can be used advantageously to optimize the sent stream for one or more elements of {power consumption, total latency, data bandwidth, receiving device identification, user identification}.

Control over the latency offers advantages beyond using the latency to compensate for disturbances in the transport link. For example, one can use latency control in cases where two streams coming from two different transport links need to be synchronized. For example, an audio stream coming from both via the air and as a WiFi stream. In this case the WiFi stream could match the latency introduced by the air due to the distance from the speaker. Another example would be a video coming from WiFi and an audio signal coming from Bluetooth. Both transport links have different characteristics, but with a correct timestamping latency control would allow them to be completely synchronized on the receiver.

Furthermore, as having a stream repair algorithm in place can ensure quality of the stream even under severe conditions, the device has the ability to further reduce the latency taking into account the amount of time the repair algorithm is able to infer with a certain quality. For example, in a solution wherein for perfect reproduction 100 ms of data should be buffered, having a mechanism that is able to optimally infer 60 ms of data would make it possible to reduce the latency introduced by the buffer to 40 ms, whereby the repair mechanisms account for the remaining 60 ms.

The proposed solution allows for determining a target latency based on statistical analysis of a subset of data indicative of the evolution of the input rate over time, said subset of data containing only information relevant to a periodic event that has been detected and can be avoided in the future.

The proposed solution allows outputting multimedia data from the communication device with a latency in line with a target value. Received data packets containing the multimedia data are stored in a buffer in the device. The data packets are received at an input rate, which is not necessarily constant. At least one characteristic yielding an indication of that input rate is derived, e.g. by measurement. A preferred characteristic to derive this information from is the time of arrival of the received data packets or the temporal length of the received data packets. Further, the actual latency introduced by the buffer is determined. Also information concerning the output rate is obtained, by measurement or e.g. from the specifications of the device. All information is then available for adjusting the latency so that it complies with a target latency value for said multimedia data. The target latency is based on statistical information derived from the information previously gathered, namely the at least one characteristic giving information on the input rate on the one hand and the information on the output rate on the other hand. Next the output rate or the rate at which the input multimedia data is stored in the buffer is adapted, thereby adjusting the additional latency introduced by the buffer to bring it in accordance with the determined target latency. The statistical information may comprise at least one element of {average input rate, standard deviation of the input rate, a percentile of the input rate}. The target latency can be expressed as a finite set of latency values, from which a value is selected. Alternatively, the target latency is given as a single value. Also a range of possible values with a minimum and maximum value can be provided.

The data packets may further comprise a sample-accurate time stamp, allowing the buffer to be represented as a virtual time line. The method may then comprise a step of data gap restoration exploiting the virtual time line. Data gap restoration has the primary advantage of preserving the temporal behaviour of the original multimedia data (by introducing a gap of the same temporal length as the data that has been missing during the transport). These gaps can be filled with forward/backward extrapolations to minimize the negative effect of the lost data.

The method may comprise a step of data inference for outputting data when the buffer contains not enough data. A preferred method for doing so is to apply forward extrapolation of the past data. Another technique involves sampling the past data to match it in the best possible continuous way.

Further a step can be performed of communicating control information to a transmitter adapted for transmitting said data packets. For example, statistical information about the input rate can be sent, so allowing analysis and optimization of this data on the sending side (e.g., by making the temporal length of the data packets larger).

The determination of the target latency may also be based on at least one element of {data quality, bandwidth, location, distance, power consumption, data type}.

A target latency might be calculated and applied continuously, as new information indicative of the input rate is available. A temporal filtering can be applied to the target latency as determined. One example is a filter that removes the high frequency content of the variation of such target latency. Another application involves a temporal filtering resulting in more relaxed decreases of said target latency, while increases of said target latencies are left unfiltered.

A device arranged for performing the algorithm according to the present invention can receive its data over the Internet, local area network or other means. This fact makes it particularly sensitive to synchronization issues. Multimedia content sent over long distances is in principle not subject to strict latency requirements, but when coupled with other transport links in parallel it might be. For example, receiving a TV broadcast via DVB-T and receiving a custom audio stream over the Internet makes the Internet stream very sensitive to delays. In such case one should keep the latency as minimum as possible.

The device containing the present invention can be a hearing aid or an implantable auditory prosthesis. Those devices are known for their low power consumption needs, as well as their low latency needs. In total implantable devices, all external audio sources need to wirelessly stream the audio signal.

Alternatively the device according to this invention is a cochlear implant, arranged for receiving a stream of stimulus patterns describing a potential at each electrode.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for buffer load management in a communication device comprising a receiver, the method comprising:
   storing in a first buffer of said receiver of said communication device, streamed multimedia data comprised in data packets and received via a transport link at an input rate;
   determining an indication of the input rate of said transport link at said first buffer and storing said indication in a second buffer containing information on the input rate over time;
   performing an autocorrelation analysis on a first signal comprising samples of said information on the input rate over time, taken from said second buffer, to form an autocorrelation signal;
   finding peaks in said autocorrelation signal and identifying, for at least one peak of the found peaks, a period of an event giving rise to said at least one peak;
   performing, for said at least one peak, a cross correlation of said first signal with a second periodic signal with given phase having said identified period as predominant period and determining a phase offset with respect to said second periodic signal;
   selecting, based on the determined phase offset, one or more parts of said information on the input rate stored in said second buffer, using a reference signal being periodic with said identified period as predominant period and having said determined phase offset;
   determining an amount of streamed multimedia data to be stored in said first buffer by analysing said selected parts of information from said second buffer; and
   applying said amount of streamed multimedia data to be stored to said first buffer by modifying the output rate and/or the input rate of said first buffer.

2. The method for buffer load management as in claim 1, further comprising a step of decimating said first signal comprising said samples of said information on the input rate over time.

3. The method for buffer load management as in claim 1, wherein the size of said second buffer corresponds to a time interval of at least 10 seconds.

4. The method for buffer load management as in claim 1, wherein said second buffer is a ring buffer.

5. The method for buffer load management as in claim 1, wherein said indication of the input rate of said transport link is the fill percentage of said first buffer.

6. The method for buffer load management as in claim 1, wherein said step of selecting one or more parts is performed using a logical function.

7. The method for buffer load management as in claim 1, wherein said selected one or more parts are stored in a third buffer.

8. The method for buffer load management as in claim 1, comprising a step of sending a message to a transmitter transmitting said streamed multimedia data, said message relating to an adjustment of the input rate.

9. The method for buffer load management as in claim 1, wherein a new target amount of data to be stored is calculated when said information on the input rate over time is updated.

10. The method for buffer load management as in claim 9, wherein a temporal filtering is performed on the target amount of data to be stored.

11. One or more computer-readable mediums having stored thereon executable instructions, which, when executed by one or more processors configure a computer system to performing at least the following steps for buffer load management in a communication device comprising a receiver:
   store in a first buffer of said receiver of said communication device, streamed multimedia data comprised in data packets and received via a transport link at an input rate;
   determine an indication of the input rate of said transport link at said first buffer and storing said indication in a second buffer containing information on the input rate over time;
   perform an autocorrelation analysis on a first signal comprising samples of said information on the input rate over time, taken from said second buffer, to form an autocorrelation signal;
   find peaks in said autocorrelation signal and identifying, for at least one peak of the found peaks, a period of an event giving rise to said at least one peak;
   perform, for said at least one peak, a cross correlation of said first signal with a second periodic signal with given phase having said identified period as predominant period and determining a phase offset with respect to said second periodic signal;
   select, based on the determined phase offset, one or more parts of said information on the input rate stored in said second buffer, using a reference signal being periodic with said identified period as predominant period and having said determined phase offset;

determine an amount of streamed multimedia data to be stored in said first buffer by analysing said selected parts of information from said second buffer; and apply said amount of streamed multimedia data to be stored to said first buffer by modifying the output rate and/or the input rate of said first buffer.

12. A communication device comprising:

an input and an output for receiving and outputting streamed multimedia data comprised in data packets;

a first buffer for storing said data packets received via a transport link at an input rate;

a second buffer for storing an indication of the input rate of said transport link;

a controller circuit configured to control the output rate of said first buffer;

a processor arranged to:

store in the first buffer the streamed multimedia data, determine an indication of the input rate of said transport link at said first buffer and store said indication in the second buffer, perform an autocorrelation analysis on a first signal comprising samples of said information on the input rate over time, taken from said second buffer, to form an autocorrelation signal, find peaks in said autocorrelation signal and identify, for at least one peak of the found peaks, a period of an event giving rise to said at least one peak, perform, for said at least one peak, a cross correlation of said first signal with a second periodic signal with given phase having said identified period as predominant period and determine a phase offset with respect to said second periodic signal, select, based on the determined offset, one or more parts of said information on the input rate stored in said second buffer, using a reference signal being periodic with said identified period as predominant period and having said determined phase offset, determine an amount of streamed multimedia data to be stored in said first buffer by analysing said selected parts of information from said second buffer, and apply said amount of streamed multimedia data to be stored to said first buffer by modifying the output rate and/or the input rate of said first buffer.

\* \* \* \* \*